US010613417B2

(12) United States Patent
Mun et al.

(10) Patent No.: US 10,613,417 B2
(45) Date of Patent: Apr. 7, 2020

(54) MULTI-APERTURE CAMERA SYSTEM HAVING AUTO FOCUSING FUNCTION AND/OR DEPTH ESTIMATION FUNCTION

(71) Applicant: CENTER FOR INTEGRATED SMART SENSORS FOUNDATION, Daejeon (KR)

(72) Inventors: Junho Mun, Suwon-si (KR); Dongsuk Kim, Gunpo-si (KR); Chong Min Kyung, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 103 days.

(21) Appl. No.: 15/579,055

(22) PCT Filed: Jun. 3, 2015

(86) PCT No.: PCT/KR2015/005569
§ 371 (c)(1),
(2) Date: Dec. 1, 2017

(87) PCT Pub. No.: WO2016/195135
PCT Pub. Date: Dec. 8, 2016

(65) Prior Publication Data
US 2019/0049821 A1  Feb. 14, 2019

(51) Int. Cl.
*H04N 5/232* (2006.01)
*H04N 5/222* (2006.01)
(Continued)

(52) U.S. Cl.
CPC ............. *G03B 13/36* (2013.01); *G03B 3/10* (2013.01); *G06T 7/55* (2017.01); *G06T 7/593* (2017.01);
(Continued)

(58) Field of Classification Search
CPC ...... G03B 13/36; G03B 3/10; H04N 5/23212; H04N 5/2254; H04N 5/2226; H04N 5/235;
(Continued)

(56) References Cited

U.S. PATENT DOCUMENTS 4,826,315 A * 5/1989 Kohayakawa ..... G01M 11/0228
356/125
2006/0092314 A1 * 5/2006 Silverstein ............ G02B 7/346
348/349

(Continued)

FOREIGN PATENT DOCUMENTS

KR   1020090125029 A   12/2009
KR   1020130140617     12/2013
(Continued)

*Primary Examiner* — Hung H Lam
(74) *Attorney, Agent, or Firm* — Hayes Soloway PC

(57) ABSTRACT

A multi-aperture camera system having an auto focusing function comprises: multiple apertures; an image sensor that creates multiple images by processing light signals introduced through the multiple apertures, respectively; and an auto focusing unit that determines a distance by which the image sensor moves relative to the multiple apertures by using the multiple images for auto focusing, wherein at least one of the multiple apertures has a central position that is misaligned with those of the remaining apertures other than the at least one aperture.

8 Claims, 10 Drawing Sheets

(51) Int. Cl.
*G03B 13/36* (2006.01)
*G03B 3/10* (2006.01)
*H04N 5/238* (2006.01)
*G06T 7/55* (2017.01)
*G06T 7/593* (2017.01)
*H04N 5/235* (2006.01)
*H04N 5/225* (2006.01)
*H04N 5/33* (2006.01)
*H04N 9/097* (2006.01)

(52) U.S. Cl.
CPC ......... *H04N 5/2226* (2013.01); *H04N 5/2254* (2013.01); *H04N 5/235* (2013.01); *H04N 5/238* (2013.01); *H04N 5/23212* (2013.01); *H04N 5/23229* (2013.01); *G06T 2207/10012* (2013.01); *H04N 5/23232* (2013.01); *H04N 5/332* (2013.01); *H04N 9/097* (2013.01)

(58) Field of Classification Search
CPC .... H04N 9/097; H04N 5/332; H04N 5/23232; H04N 5/238; H04N 5/23229; G06T 7/50
See application file for complete search history.

(56) References Cited

U.S. PATENT DOCUMENTS

| 2012/0113227 | A1 | 5/2012 | Paik et al. |
| 2013/0235250 | A1* | 9/2013 | Fainstain ........... H04N 5/23212 348/345 |

FOREIGN PATENT DOCUMENTS

| WO | 2012007049 A1 | 1/2012 |
| WO | 2012057622 A1 | 5/2012 |
| WO | 2015015383 A2 | 2/2015 |

* cited by examiner

MULTI-APERTURE CAMERA SYSTEM HAVING AUTO FOCUSING FUNCTION AND/OR DEPTH ESTIMATION FUNCTION

TECHNICAL FIELD

The present disclosure relates to a multi-aperture camera system having an auto focusing function and/or a depth estimation function, and more particularly, relates to technologies for the multi-aperture camera system having the auto focusing function and/or the depth estimation function by including a plurality of apertures.

BACKGROUND ART

After cameras as mass-produced models, each of which includes an auto focusing function, have first come to the market in 1977 from Konica, a variety of auto focusing technologies applying mechanical and non-mechanical systems have been developed. Further, several technologies for depth estimation of subjects using stereo camera technology, time of flight technology, structured technology, and the like may have been developed.

Conventional auto focusing technology may be roughly classified as an active system or a passive system. Since an ultrasonic or infrared generator is needed in the active system divided into a system using ultrasonic waves and a system using infrared rays, relatively large amounts of additional power may be required. If there is a window between a camera and a subject or if the camera and the subject are in a very distant place or are close to each other, focus may fail to be made.

The passive system may be an autofocus rangefinder system, a contrast detection system, a phase-difference detection system, or the like. The autofocus rangefinder system may be a system of extracting a depth through a method of performing coincidence of stereo images based on a triangulation principle and performing auto focusing in a rangefinder camera. The contrast detection system may be an auto focusing system currently used in most compact digital cameras and may be a system of continuing calculating contrasts of some of images while moving a lens and determining that focus is made if there is a maximum contrast value. The phase-difference detection system may divide light incident through a lens into one pair and compare a pair of lights to determine whether focus is made. For this purpose, a sensor for phase-difference detection should be used additionally, or a sensor of a dual pixel structure should be used.

However, the autofocus rangefinder system should perform auto focusing using an image obtained by an additional structure which is a rangefinder rather than an image captured by a camera. Since the contrast detection system calculates a contrast between images while continuing moving a lens, it takes a long time to perform auto focusing. If a phase-difference detection sensor is separately used in the phase-difference detection system, since a very precise array is needed, there may be a problem in mass production and quality management and it may be difficult to be applied to a micro-camera such as a mobile phone camera. Further, sensor costs may be increased in a system for phase-difference detection using a dual pixel sensor, particularly, a micro-camera have a technical problem in implementing the dual pixel sensor on a trend where an image sensor pixel becomes smaller and smaller in size.

Stereo camera technology which is one of technologies for depth estimation for a subject may be a manner of installing two optical systems at a constant distance, obtaining images of the subject from sensors of the two optical systems, and comparing a disparity between the two images to estimate a depth. Since this manner obtains images using the two different sensors, a synchronization process between the two images may be needed and costs for a precise array and image adjustment for the synchronization process may be needed.

Further, the time of flight technology and the structured light technology among technologies for depth estimation of a subject may be technologies of irradiating rays such as infrared rays and estimating a depth using a detector. It may be difficult for the time of flight technology and the structured light technology to be used outdoors. The time of flight technology and the structured light technology may have much power consumption.

Thus, a multi-aperture camera system having an auto focusing function and/or a depth estimation function for solving disadvantages and problems of conventional auto focusing technology and/or conventional depth estimation technology is proposed.

DETAILED DESCRIPTION OF THE INVENTION

Technical Problem

An aspect of the present disclosure is to provide a multi-aperture camera system having an auto focusing function and/or a depth estimation function for solving disadvantages and problems of conventional auto focusing technology and conventional depth estimation technology by including a plurality of apertures having different central locations.

Technical Solution

In accordance with an aspect of the present disclosure, a multi-aperture camera system having an auto focusing function is provided. The multi-aperture camera system may include a plurality of apertures, an image sensor configured to generate a plurality of images by processing an optical signal introduced through each of the plurality of apertures, and an auto focusing unit configured to determine a moving distance of the image sensor using the characteristics of the plurality of apertures and the plurality of images for auto focusing. At least one aperture among the plurality of apertures may have a central location which is misaligned with a central location of the other aperture except for the at least one aperture among the plurality of apertures.

The plurality of apertures may be formed on one optical system.

The at least one aperture may be formed on the other aperture.

The other aperture may be formed by including a filter which detects a specific optical signal in an optical system in which the plurality of apertures are formed.

The at least one aperture may be formed by etching a specific region on the other aperture.

The at least one aperture and the other aperture may be formed to have one of a circle, a triangle, a quadrangle, or a polygon.

The at least one aperture may introduce an optical signal of a different wavelength from a wavelength of an optical signal introduced by the other aperture.

The auto focusing unit may determine the moving distance of the image sensor using the characteristics of the plurality of apertures, based on a difference between central locations of the plurality of images, a distance between a central location of the at least one aperture and a central location of the other aperture, a distance between an optical system in which the plurality of apertures are formed and the image sensor, a subject distance which is focused on the image sensor, and a focal distance.

The auto focusing unit may verify the moving distance of the image sensor using the characteristics of the plurality of apertures and a difference between blur levels in the plurality of images.

In accordance with another aspect of the present disclosure, a multi-aperture camera system having a depth estimation function is provided. The multi-aperture camera system may include a plurality of apertures, an image sensor configured to generate a plurality of images by processing an optical signal introduced through each of the plurality of apertures, and a depth estimation unit configured to estimate a depth from a subject to an optical system in which the plurality of apertures are formed, using the plurality of images. At least one aperture among the plurality of apertures may have a central location which is misaligned with a central location of the other aperture except for the at least one apertures among the plurality of apertures.

The plurality of apertures may be formed on one optical system.

The at least one aperture may be formed on the other aperture.

The other aperture may be formed by including a filter which detects a specific optical signal in the optical system in which the plurality of apertures are formed.

The at least one aperture may be formed by etching a specific region on the other aperture.

The at least one aperture and the other aperture may be formed to have one of a circle, a triangle, a quadrangle, or a polygon.

The at least one aperture may introduce an optical signal of a different wavelength from a wavelength of an optical signal introduced by the other aperture.

The depth estimation unit may estimate the depth from the subject to the optical system in which the plurality of apertures are formed, based on a difference between central locations of the plurality of images, a distance between a central location of the at least one aperture and a central location of the other aperture, a subject distance which is focused on the image sensor, and a focal distance.

The depth estimation unit may verify the depth from the subject to the optical system in which the plurality of apertures are formed, using a difference between blur levels in the plurality of images.

Advantageous Effects of the Invention

Embodiments of the present disclosure may provide a multi-aperture camera system having an auto focusing function and/or a depth estimation function for solving disadvantages and problems of conventional auto focusing technology and conventional depth estimation technology by including a plurality of apertures having different central locations on one optical system.

In detail, embodiments of the present disclosure may provide a multi-aperture camera system which may be manufactured at a lower cost than a multi-aperture camera system having a conventional auto focusing function and a conventional depth estimation function by including a plurality of apertures having different central locations on one optical system.

Further, embodiments of the present disclosure provides a multi-aperture camera system which may operate an auto focusing function and/or a depth estimation function if a focal distance is long as well as if the focal distance is short and everywhere in the interior and exterior by including a plurality of apertures having different central locations on one optical system.

Further, embodiments of the present disclosure provides a multi-aperture camera system for performing an auto focusing process and/or a depth estimation process at a high speed by including a plurality of apertures having different central locations on one optical system.

BEST MODE

Figure 1:
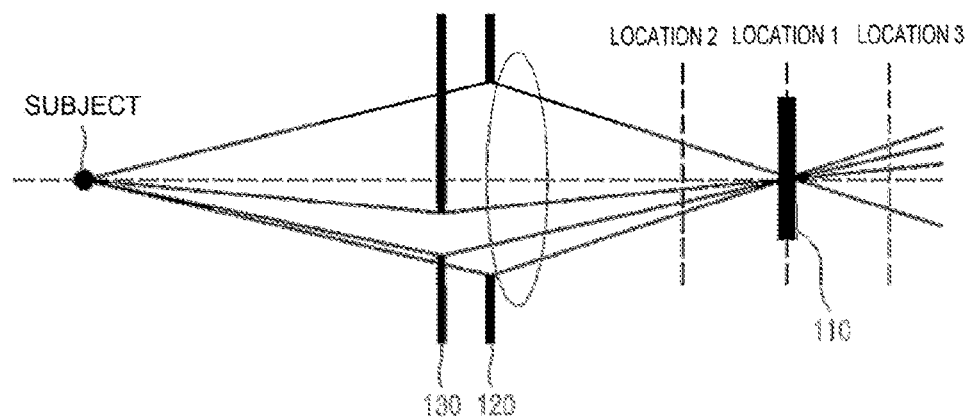
FIG. 1 is a drawing illustrating a principle for an auto focusing function and a depth estimation function of a camera system according to an embodiment of the present disclosure.

Hereinafter, a description will be given in detail of embodiments with reference to the accompanying drawings. However, the present disclosure is restricted or limited to embodiments of the present disclosure. Further, like reference numerals shown in each drawing indicate like members.

Further, the terminology used in the specification may be terms used to properly represent an exemplary embodiment of the present disclosure and may vary according to intention of a user or an operator or custom of a field included in the present disclosure. Therefore, the terminology will be defined based on contents across the specification.

FIG. 1 is a drawing illustrating a principle for an auto focusing function and a depth estimation function of a camera system according to an embodiment of the present disclosure.

Referring to FIG. 1, if an image surface 110 on which an image of a subject is focused is located on location 1 which is a focal distance in the camera system according to an embodiment of the present disclosure (if an image sensor which generates an image by processing an optical signal is located in the image surface 110), since the subject is correctly focused, an optical signal introduced through each of a plurality of apertures 120 and 130 may be processed to generate a clear image. Hereinafter, an embodiment is exemplified as the plurality of apertures 120 and 130 included in the camera system include the aperture 120 which introduces a visible ray and the aperture 130 which introduces an infrared ray. However, embodiments are not limited thereto. For example, the plurality of apertures 120 and 130 may include various apertures which introduce optical signals of different wavelengths.

However, if the image surface 110 is located on location 2, since the subject is incorrectly focused and a blur occurs, an optical signal introduced through each of the plurality of apertures 120 and 130 may be processed to generate an image in which the blur exists. In this case, since a central location of a visible image generated by the visible aperture 120 among a plurality of images for the subject is not identical to a central location of an infrared image generated by the infrared aperture 130, there may be a phenomenon in which the center of the infrared image is skewed towards the right with respect to the center of the visible image. On the other hand, if the image surface 110 is located on location 3, there may be a phenomenon in which the center of the infrared image is skewed towards the left with respect to the center of the visible image.

The camera system according to an embodiment of the present disclosure may have an auto focusing function and a depth estimation function using the above-mentioned principle by including the plurality of apertures 120 and 130, central locations of which are misaligned with each other. A detailed description for this is given hereafter.

Figure 2:
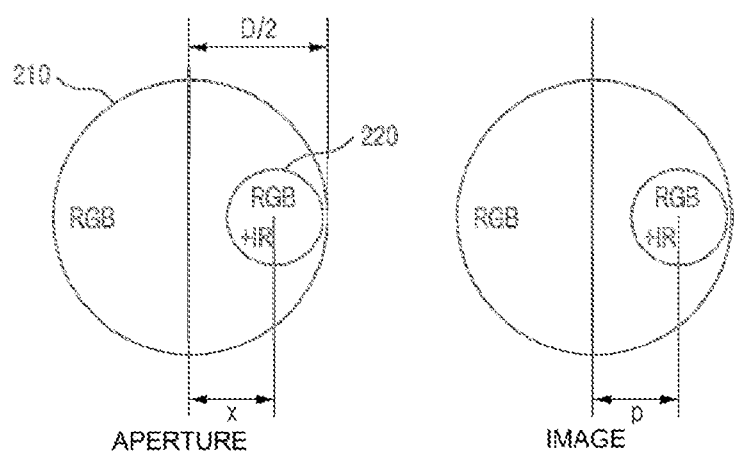
FIG. 2 is a drawing illustrating an auto focusing function and a depth estimation function of a camera system according to an embodiment of the present disclosure.
Figure 2:
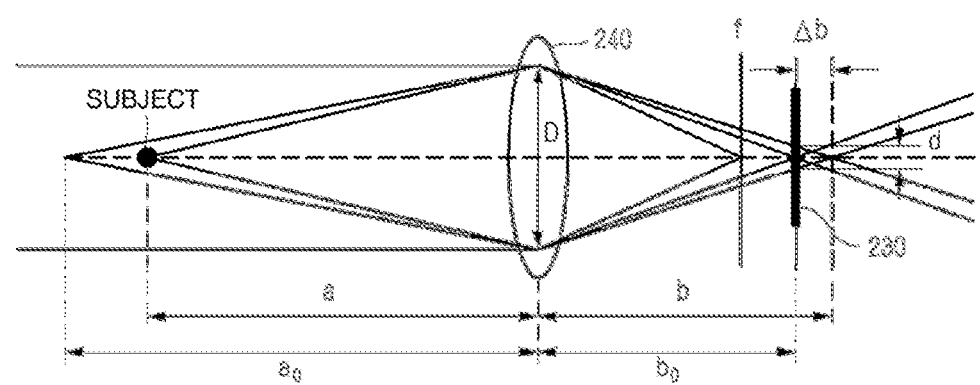

FIG. 2 is a drawing illustrating an auto focusing function and a depth estimation function of a camera system according to an embodiment of the present disclosure.

Referring to FIG. 2, the camera system according to an embodiment of the present disclosure may have the auto focusing function and the depth estimation function by including a plurality of apertures 210 and 220 using the above-mentioned principle.

In detail, a disparity p between a central location of a visible image generated by the visible aperture 210 among the plurality of apertures 210 and 220 and a central location of an infrared image generated by the infrared aperture 220 among the plurality of apertures 210 and 220 may be calculated like Equation 1 based on the above-mentioned principle.

$$p = \frac{x}{D} \cdot \frac{f^2}{F\#(a_0 - f)}\left(\frac{a_0}{a} - 1\right) \quad \text{[Equation 1]}$$

In Equation 1, x may refer to a disparity between the central location of the visible aperture 210 and the central location of the infrared aperture 220, D may refer to a diameter of the visible aperture 210, f may refer to a focal distance, F # may refer to a brightness value of a lens in the camera system, a may refer to a subject distance, and $a_0$ may refer to a subject distance which is focused on an image sensor 230.

In this case, if a value of the disparity p between the central location of the visible image and the central location of the infrared image is changed from a positive number to a negative number or is changed from the negative number to the positive number, a direction of a disparity between the two images may be changed. Thus, it may be distinguished whether a subject having a boundary blur is located in the foreground or background, according to a sign of a value of the disparity p.

Further, depth a for the subject (a depth from the subject to an optical system 240 in which the plurality of apertures 210 and 220 are formed) may be calculated like Equation 2 from Equation 1.

$$a = \frac{a_0}{1 + \frac{(a_0 - f)}{f} \cdot \frac{p}{x}} \quad \text{[Equation 2]}$$

In Equation 2, $a_0$ may refer to a subject distance which is focused on the image sensor 230, f may refer to a focal distance, p may refer to a disparity between the central location of the visible image and the central location of the infrared image, and x may refer to a disparity between the central location of the visible aperture 210 and the central location of the infrared aperture 220.

Further, distance $\Delta b$ in which the image sensor 230 moves for auto focusing may be calculated like Equation 3.

$$\Delta b = \frac{b_0}{\frac{x}{p} - 1} = \frac{1}{\frac{x}{p} - 1} \cdot \frac{a_0 f}{a_0 - f} \quad \text{[Equation 3]}$$

In Equation 3, P may refer to a disparity between the central location of the visible image and the central location of the infrared image, x may refer to a disparity between the central location of the visible aperture 210 and the central location of the infrared aperture 220, $b_0$ may refer to a distance between the optical system 240 in which the plurality of apertures 210 and 220 are formed and the image sensor 230, $a_0$ may refer to a subject distance which is focused on the image sensor 230, and f may refer to a focal distance.

As such, the camera system according to an embodiment of the present disclosure may estimate a depth like Equation 2 and may automatically adjust a focus like Equation 3 by including the plurality of apertures 210 and 220 formed such that their central locations are misaligned with each other.

In this case, the plurality of apertures 210 and 220 may be formed on the one optical system 240. A detailed description for this will be given with reference to FIGS. 3 to 4C.

Further, the camera system may verify the estimated depth and the adjusted focus like Equations 4 to 6 using a difference between blur levels in a plurality of images respectively generated by the plurality of apertures 210 and 220.

First of all, blur d of each of a visible image and an infrared image may be represented like Equation 4.

$$d = \frac{f^2}{F\#(a_0 - f)}\left|\frac{a_0}{a} - 1\right| \quad \text{[Equation 4]}$$

In Equation 4, f may refer to a focal distance, F # may refer to a brightness value of a lens in the camera system, a may refer to a depth to the optical system 240 in which the plurality apertures 210 and 220 are formed, and $a_0$ may refer to a subject distance which is focused on the image sensor 230.

Thus, the camera system may calculate Equation 5 indicating a depth from the subject to the optical system 240 in which the plurality apertures 210 and 220 are formed and may calculate Equation 6 indicating a distance Δb in which the image sensor 230 moves for auto focusing.

$$a = \frac{a_0}{1 + \frac{F\#(a_0 - f)}{f^2}d} (a < a_0) \quad \text{[Equation 5]}$$

$$a = \frac{a_0}{1 + \frac{F\#(a_0 - f)}{f^2}d} (a < a_0)$$

In Equation 5, F # may refer to a brightness value of the lens in the camera system, $a_0$ may refer to a subject distance which is focused on the image sensor 230, f may refer to a focal distance, and d may refer to a level of a blur of each of a visible image and an infrared image or a disparity between blurs of the visible image and the infrared image. Thus, the camera system may verify a depth estimated from Equation 2 using Equation 5.

$$\Delta b = \frac{b_0}{\left|\frac{f}{dF\#} - 1\right|} = \frac{1}{\left|\frac{f}{dF\#} - 1\right|} \cdot \frac{a_0 f}{a_0 - f} \quad \text{[Equation 6]}$$

In Equation 6, d may refer to a level of a blur of each of the visible image and the infrared image or a disparity between blurs of the visible image and the infrared image, f may refer to a focal distance, F # may refer to a brightness value of the lens in the camera system, $b_0$ may refer to a distance between the optical system 240 in which the plurality of apertures 210 and 220 are formed and the image sensor 230, and $a_0$ may refer to a subject distance which is focused on the image sensor 230. Thus, the camera system may verify the distance in which the image sensor 230 move for auto focusing, calculated from Equation 3, using Equation 6.

Figure 3:
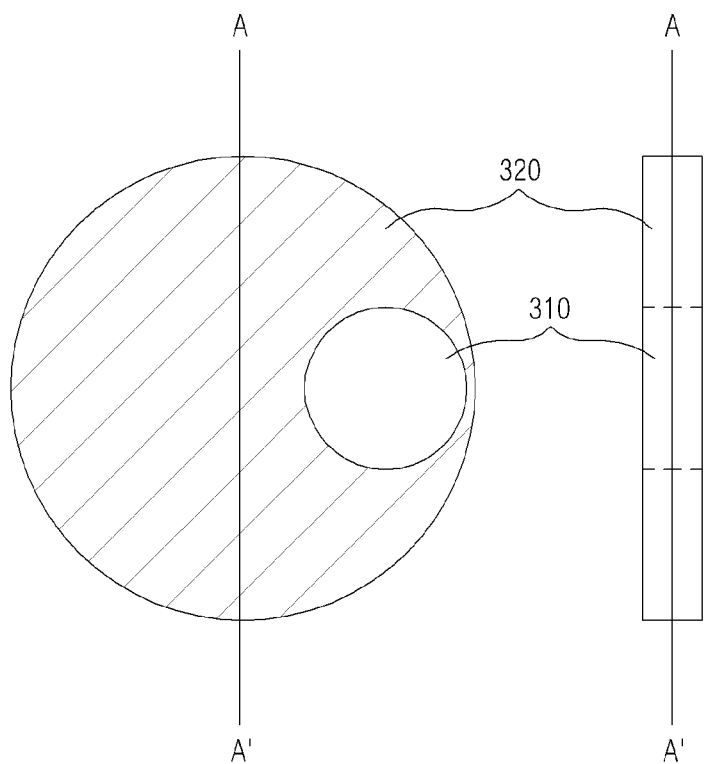
FIG. 3 is a drawing illustrating a plurality of apertures according to an embodiment of the present disclosure.

FIG. 3 is a drawing illustrating a plurality of apertures according to an embodiment of the present disclosure.

Referring to FIG. 3, at least one aperture 310 among a plurality of apertures 310 and 320 according to an embodiment of the present disclosure may have a central location which is misaligned with a central location of the other aperture 320 except for the at least one aperture 310 among the plurality of apertures 310 and 320. Hereinafter, an embodiment is exemplified as the plurality of apertures 310 and 320 are configured with the two apertures. However, embodiments are not limited thereto. For example, the plurality of apertures 310 and 320 may be configured with three apertures, four apertures, or the like. A detailed description for this will be given with reference to FIG. 4.

Further, the plurality of apertures 310 and 320 may be formed on one optical system. Particularly, the at least one aperture 310 among the plurality of apertures 310 and 320 may be formed on the other aperture 320.

In this case, the other aperture 320 may be formed by including a filter which detects a specific optical signal in the optical system in which the plurality of apertures 310 and 320 are formed, and the at least one aperture 310 may be formed by etching a specified region on the other aperture 320. For example, the other aperture 320 may be formed by coating a filter which blocks an optical signal of greater than or equal to a wavelength of 650 nm on a rear surface of an optical system which is formed of a glass plate and coating a filter which blocks an optical signal of greater than or equal to a wavelength of 810 nm on a front surface of the optical system which is formed of the glass plate. Further, the at least one aperture 310 may be formed by etching a specific region on the other aperture 320 to have a central location which is misaligned with a central location of the other aperture 320.

Thus, the at least one aperture 310 may introduce an optical signal of a different wavelength from a wavelength of an optical signal introduced by the other aperture 320. For example, the optical signal introduced through the other aperture 320 may be an optical signal of a visible wavelength, and the optical signal introduced through the at least one aperture 310 may be an optical signal of a visible wavelength and an optical signal of an infrared wavelength.

In this case, each of the plurality of apertures may be formed in various forms to have one of a circle, a triangle, a quadrangle, or a polygon.

Further, the optical system in which the plurality of apertures 310 and 320 are formed may be adaptively located on an upper or lower portion of a lens included in a camera system.

Figure 4A:
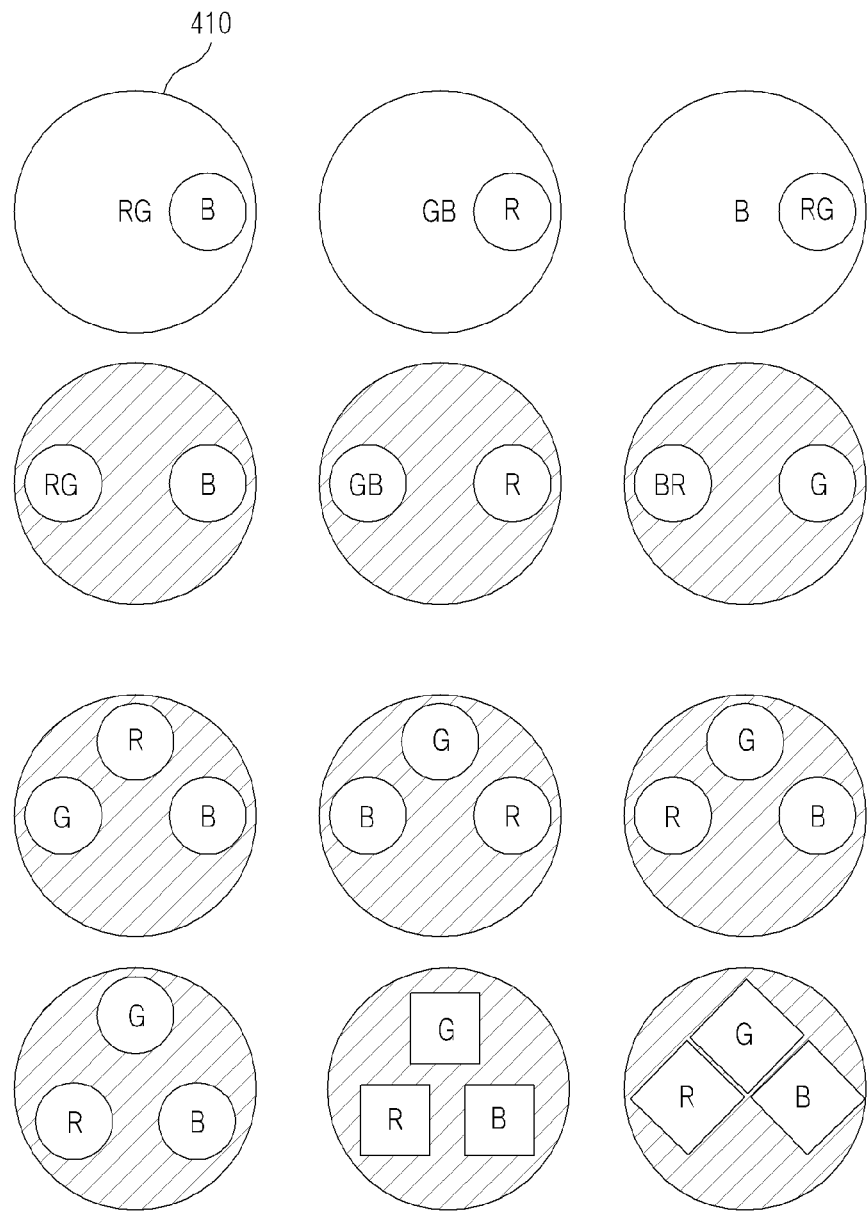
FIGS. 4A, 4B, and 4C are drawings illustrating a plurality of apertures according to another embodiment of the present disclosure.
Figure 4B:
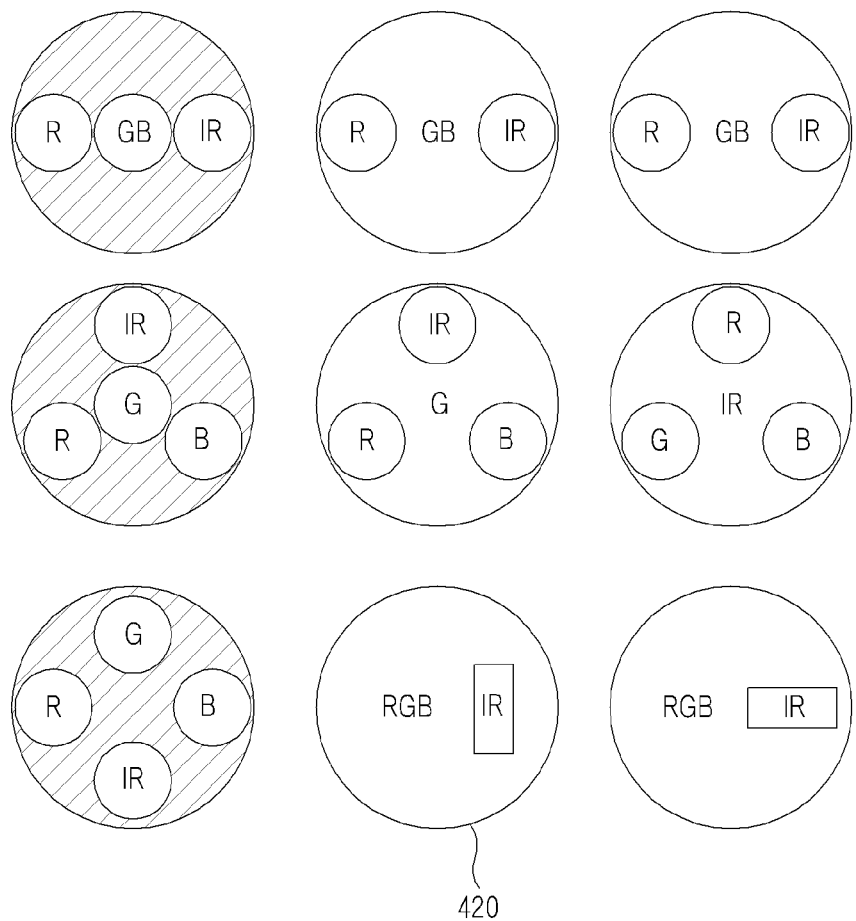
Figure 4C:
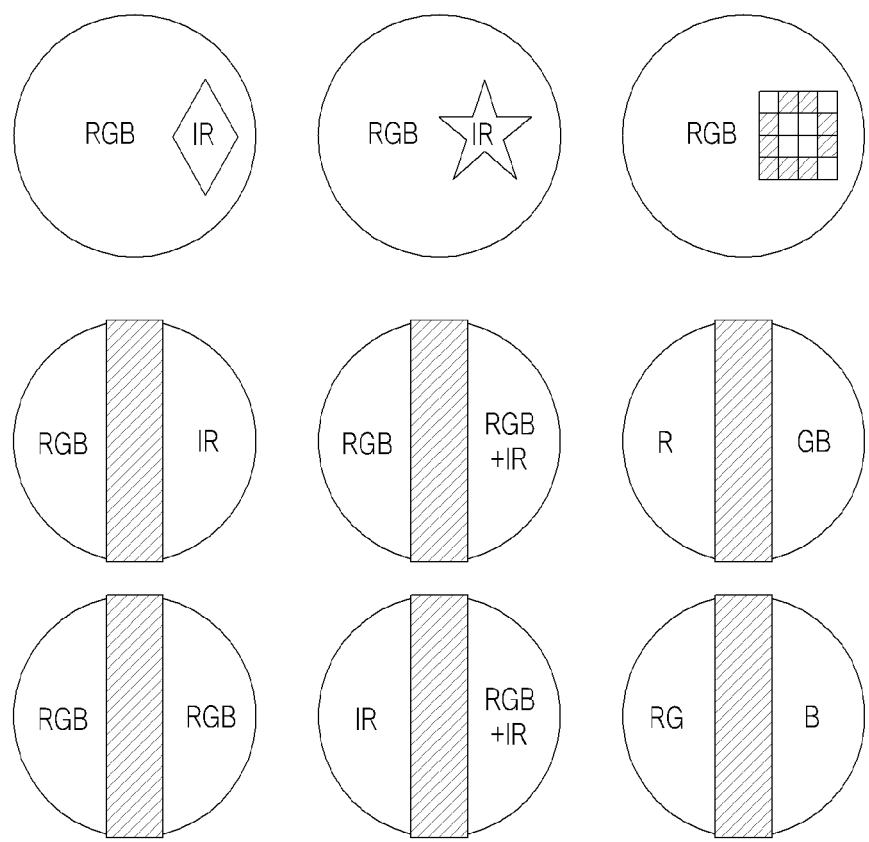

FIGS. 4A to 4C are drawings illustrating a plurality of apertures according to another embodiment of the present disclosure.

Referring to FIGS. 4A to 4C, the plurality of apertures included in a camera system according to an embodiment of the present disclosure may have various number of apertures included in the plurality of apertures or various forms of apertures included in the plurality of apertures.

For example, as shown in reference numeral 410, the plurality of apertures included in the camera system may be configured with a first aperture which introduces a red-green (RG) signal and a second aperture which introduces a blue (B) signal, the first aperture and the second aperture being formed on one optical system. Further, as shown in reference numeral 420, the plurality of apertures may be configured with a first aperture which introduces an RGB signal and a second aperture which introduces an infrared (IR) signal.

The plurality of apertures are not restricted or limited to FIGS. 4A to 4C and may be configured with various forms of various number of apertures.

Figure 5:
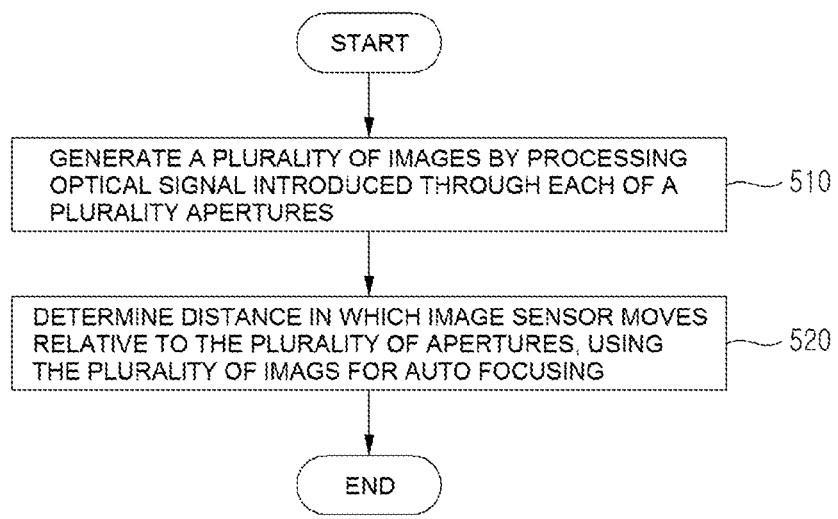
FIG. 5 is a flowchart illustrating an auto focusing method of a camera system according to an embodiment of the present disclosure.

FIG. 5 is a flowchart illustrating an auto focusing method of a camera system according to an embodiment of the present disclosure.

Referring to FIG. 5, in operation 510, the camera system according to an embodiment of the present disclosure may generate a plurality of images by processing an optical signal introduced through each of a plurality of apertures.

Herein, at least one aperture among the plurality of apertures may have a central location which is misaligned with a central location of the other aperture except for the at least one aperture among the plurality of apertures. In this case, the at least one aperture may introduce an optical signal of a different wavelength from a wavelength of an optical signal introduced by the other aperture.

Further, the plurality apertures may be formed on one optical system. Particularly, the at least one aperture among the plurality of apertures may be formed on the other aperture except for the at least one aperture among the plurality of apertures.

For example, the other aperture may be formed by including a filter which detects a specific optical signal in the optical system where the plurality of apertures are formed, and the at least one aperture may be formed by etching a specific region on the other aperture.

Further, each of the plurality of apertures may be formed to have one of a circle, a triangle, a quadrangle, or a polygon.

In operation 510, the camera system may process the plurality of images and may calculate parameters for auto focusing. For example, the camera system may calculate a disparity between central locations of the plurality of images, a distance between a central location of the at least one aperture and a central location of the other aperture, a distance between the optical system in which the plurality of apertures are formed and an image sensor, a subject distance which is focused on the image sensor, a focal distance, and the like, as the parameters for the auto focusing.

In operation 520, the camera system may determine a moving distance of the image sensor using the characteristics of the plurality of apertures and the plurality of images for auto focusing.

In detail, the camera system may determine a moving distance of the image sensor using the characteristics of the plurality of apertures, based on a difference between central locations of the plurality of images, a distance between a central location of the at least one aperture and a central location of the other aperture, a distance between the optical system in which the plurality of apertures are formed and the image sensor, a subject distance which is focused on the image sensor, and a focal distance, which are obtained from the plurality of images.

Further, although not illustrated in FIG. 5, the camera system may verify the distance of the image sensor using the characteristics of the plurality of apertures and a difference between blur levels in the plurality of images.

Thus, the camera system may focus by moving the image sensor or may moving a lens barrel in which the optical system where the plurality of apertures are formed is fixed to relatively move the mage sensor, based on the distance determined in operation 520.

Figure 6:
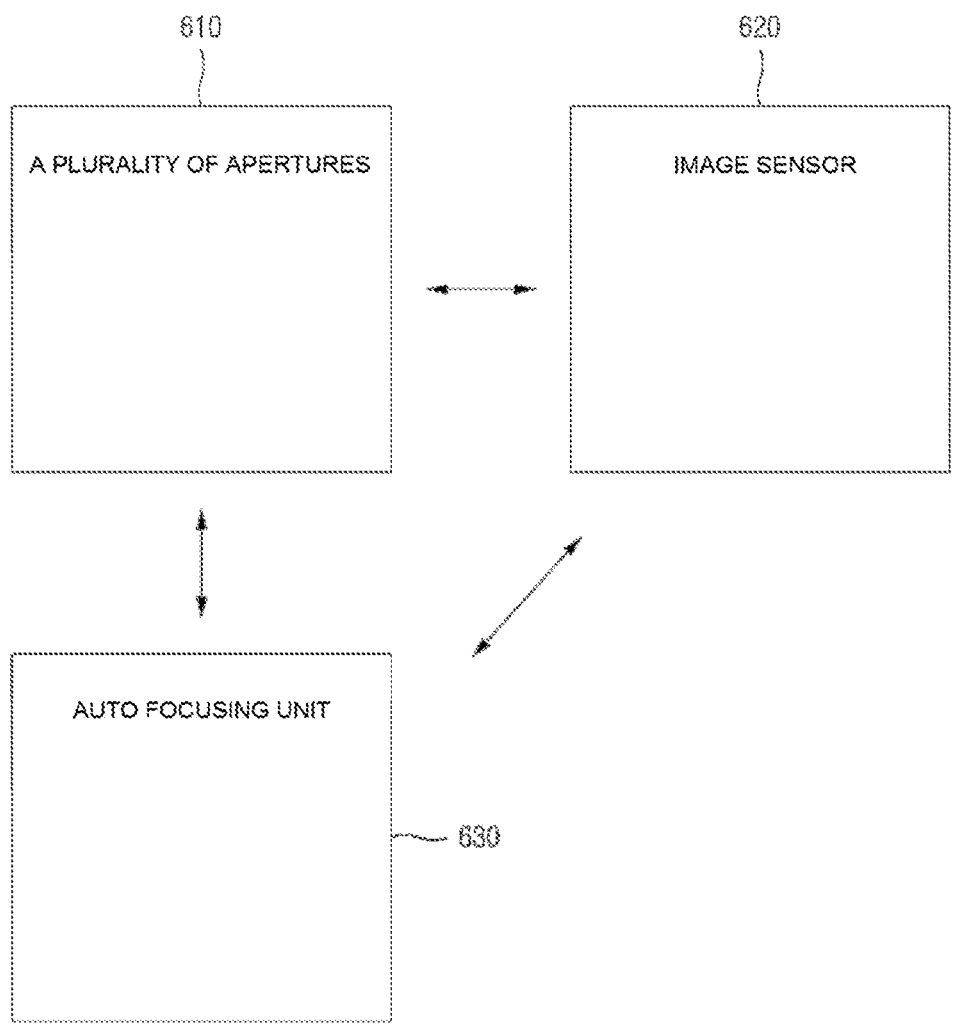
FIG. 6 is a block diagram illustrating a camera system having an auto focusing function according to an embodiment of the present disclosure.

FIG. 6 is a block diagram illustrating a camera system having an auto focusing function according to an embodiment of the present disclosure.

Referring to FIG. 6, the camera system according to an embodiment of the present disclosure may include a plurality of apertures 610, an image sensor 620, and an auto focusing unit 630.

Herein, at least one aperture among the plurality of apertures 610 may have a central location which is misaligned with a central location of the other aperture except for the at least one aperture among the plurality of apertures 610. In this case, the at least one aperture may introduce an optical signal of a different wavelength from a wavelength of an optical signal introduced by the other aperture.

Further, the plurality of apertures 610 may be formed on one optical system. Particularly, the at least one aperture among the plurality of apertures 610 may be formed on the other aperture except for the at least one aperture among the plurality of apertures 610.

For example, the other aperture may be formed by including a filter which detects a specific optical signal in the optical system where the plurality of apertures 610 are formed, and the at least one aperture may be formed by etching a specific region on the other aperture.

Further, each of the plurality of apertures 610 may be formed to have one of a circle, a triangle, a quadrangle, or a polygon.

The image sensor 620 may generate a plurality of images by processing an optical signal introduced through each of the plurality of apertures 610.

In this case, the image sensor 620 may process the plurality of images and may calculate parameters for auto focusing. For example, the image sensor 620 may calculate a disparity between central locations of the plurality of images, a distance between a central location of the at least one aperture and a central location of the other aperture, a distance between the optical system in which the plurality of apertures 610 are formed and the image sensor 620, a subject distance which is focused on the image sensor 620, a focal distance, and the like, as the parameters for the auto focusing.

The auto focusing unit 630 may determine a moving distance of the image sensor 620 using the characteristics of the plurality of apertures 610 and the plurality of images for auto focusing.

In detail, the auto focusing unit 630 may determine a moving distance of the image sensor 620 using the characteristics of the plurality of apertures 610, based on a difference between central locations of the plurality of images, a distance between the central location of the at least one aperture and the central location of the other aperture, a distance between the optical system in which the plurality of apertures 610 are formed and the image sensor 620, a subject distance which is focused on the image sensor 620, and a focal distance, which are obtained from the plurality of images.

Further, although not illustrated in FIG. 6, the auto focusing unit 630 may verify the moving distance of the image sensor 620 using the characteristics of the plurality of apertures 610 and a difference between blur levels in the plurality of images.

Thus, the auto focusing unit 630 may focus by moving the image sensor 620 or may moving a lens barrel in which the optical system where the plurality of apertures 610 are formed is fixed to relatively move the mage sensor 620, based on the determined distance.

Figure 7:
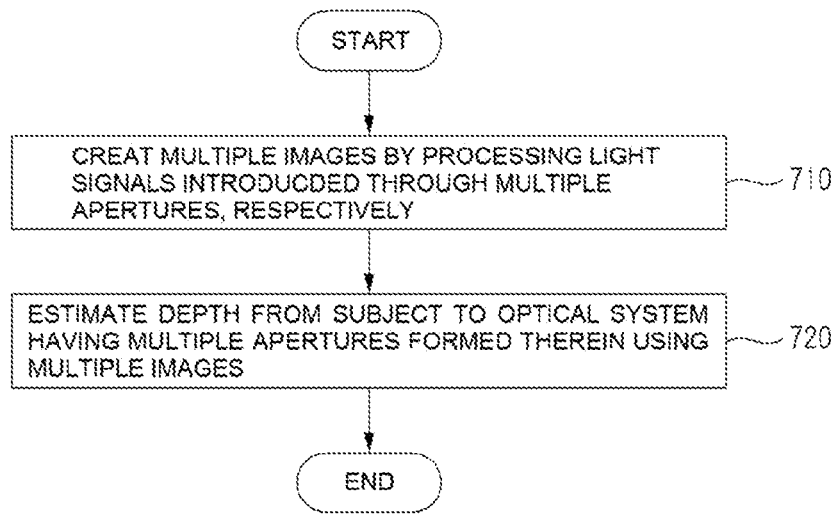
FIG. 7 is a flowchart illustrating a depth estimation method of a camera system according to an embodiment of the present disclosure.

FIG. 7 is a flowchart illustrating a depth estimation method of a camera system according to an embodiment of the present disclosure.

Referring to FIG. 7, in operation 710, the camera system according to an embodiment of the present disclosure may generate a plurality of images by processing an optical signal introduced through each of a plurality of apertures.

Herein, at least one aperture among the plurality of apertures may have a central location which is misaligned with a central location of the other aperture except for the at least one aperture among the plurality of apertures. In this case, the at least one aperture may introduce an optical signal of a different wavelength from a wavelength of an optical signal introduced by the other aperture.

Further, the plurality apertures may be formed on one optical system. Particularly, the at least one aperture among the plurality of apertures may be formed on the other aperture except for the at least one aperture among the plurality of apertures.

For example, the other aperture may be formed by including a filter which detects a specific optical signal in the optical system where the plurality of apertures are formed, and the at least one aperture may be formed by etching a specific region on the other aperture.

Further, each of the plurality of apertures may be formed to have one of a circle, a triangle, a quadrangle, or a polygon.

In operation 710, the camera system may process the plurality of images and may calculate parameters for depth estimation. For example, the camera system may calculate a disparity between central locations of the plurality of images, a distance between a central location of the at least one aperture and a central location of the other aperture, a subject distance which is focused on an image sensor, a focal distance, and the like, as the parameters for the depth estimation.

In operation 720, the camera system may estimate a depth from a subject to the optical system in which the plurality of apertures are formed, using the plurality of images.

In detail, the camera system may estimate the depth from the subject to the optical system in which the plurality of apertures are formed, based on a disparity between the central locations of the plurality of images, a distance between the central location of the at least one aperture and the central location of the other aperture, a subject distance which is focused on the image sensor, and a focal distance, which are obtained from the plurality of images.

Further, although not illustrated in FIG. 7, the camera system may verify the depth from the subject to the optical system in which the plurality of apertures are formed, using a disparity between blur levels in the plurality of images.

Figure 8:
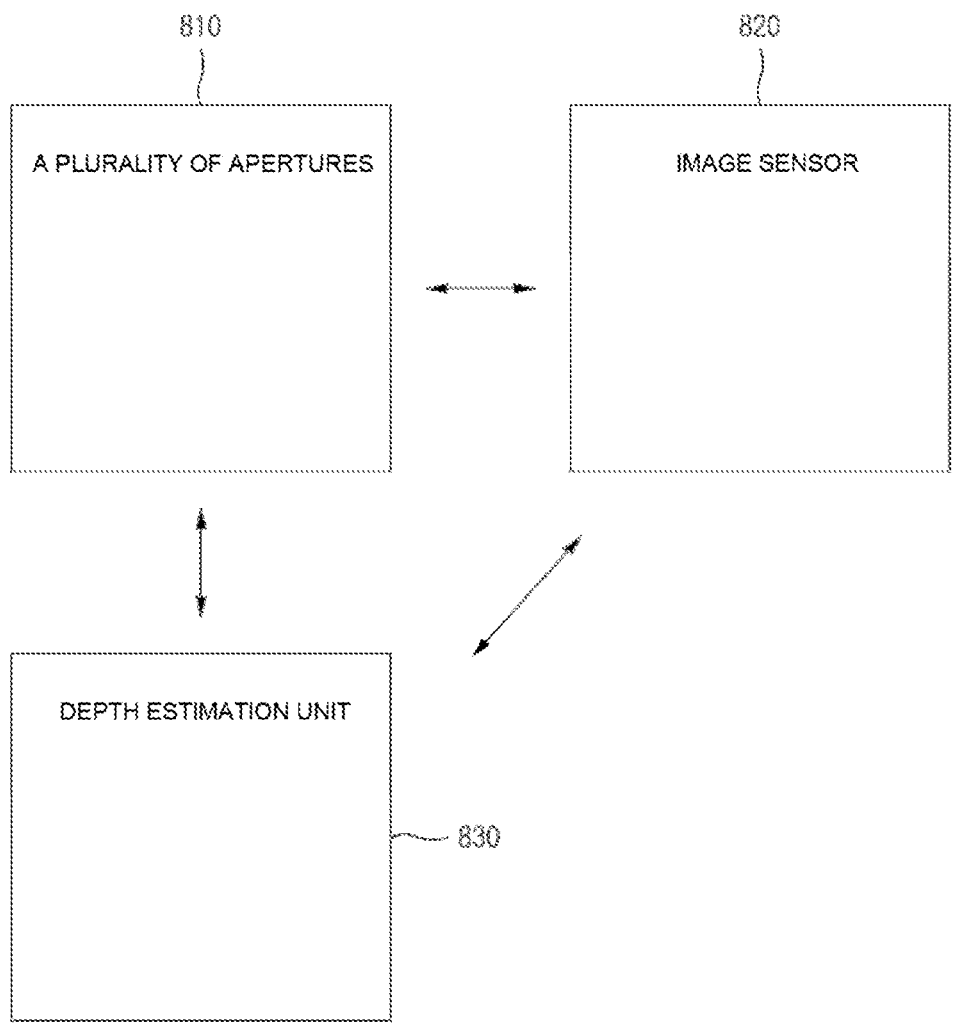
FIG. 8 is a block diagram illustrating a camera system having a depth estimation function according to an embodiment of the present disclosure.

FIG. 8 is a block diagram illustrating a camera system having a depth estimation function according to an embodiment of the present disclosure.

Referring to FIG. 8, the camera system according to an embodiment of the present disclosure may include a plurality of apertures 810, an image sensor 820, and a depth estimation unit 830.

Herein, at least one aperture among the plurality of apertures 810 may have a central location which is misaligned with a central location of the other aperture except for the at least one aperture among the plurality of apertures 810. In this case, the at least one aperture may introduce an optical signal of a different wavelength from a wavelength of an optical signal introduced by the other aperture.

Further, the plurality apertures 810 may be formed on one optical system. Particularly, the at least one aperture among the plurality of apertures 810 may be formed on the other aperture except for the at least one aperture among the plurality of apertures 810.

For example, the other aperture may be formed by including a filter which detects a specific optical signal in the optical system where the plurality of apertures 810 are formed, and the at least one aperture may be formed by etching a specific region on the other aperture.

Further, each of the plurality of apertures 810 may be formed to have one of a circle, a triangle, a quadrangle, or a polygon.

The image sensor 820 may generate a plurality of images by processing an optical signal introduced through each of the plurality of apertures 810.

In this case, the image sensor 820 may process the plurality of images and may calculate parameters for depth estimation. For example, the image sensor 820 may calculate a disparity between central locations of the plurality of images, a distance between a central location of the at least one aperture and a central location of the other aperture, a subject distance which is focused on the image sensor 820, a focal distance, and the like, as the parameters for the depth estimation.

The depth estimation unit 830 may estimate a depth from a subject to the optical system in which the plurality of apertures are formed, using the plurality of images.

In detail, the depth estimation unit 830 may estimate the depth from the subject to the optical system in which the plurality of apertures are formed, based on a disparity between the central locations of the plurality of images, a distance between the central location of the at least one aperture and the central location of the other aperture, a subject distance which is focused on the image sensor 820, and a focal distance, which are obtained from the plurality of images.

Further, although not illustrated in FIG. 8, the depth estimation unit may verify the depth from the subject to the optical system in which the plurality of apertures 810 are formed, using a disparity between blur levels in the plurality of images.

MODE FOR INVENTION

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

The invention claimed is:

1. A multi-aperture camera system having an auto focusing function, the system comprising:
a plurality of apertures;
an image sensor configured to generate a plurality of images by processing an optical signal introduced through each of the plurality of apertures; and
an auto focusing unit configured to determine a distance the image sensor moves using the characteristics of the plurality of apertures and the plurality of images for auto focusing,
wherein at least one aperture among the plurality of apertures has a central location which is misaligned with a central location of the other aperture,
wherein the auto focusing unit determines a distance where the image sensor moves relative to the plurality of apertures, based on a difference between central locations of the plurality of images, a distance between a central location of the at least one aperture and a central location of the other aperture, a distance between an optical system in which the plurality of apertures are formed and the image sensor, a subject distance which is focused on the image sensor, and a focal distance.

2. The system of claim 1, wherein the plurality of apertures are formed on one optical system.

3. The system of claim 1, wherein the at least one aperture is formed on the other aperture.

4. The system of claim 3, wherein the other aperture js formed by including a filter which detects a specific optical signal in an optical system in which the plurality of apertures are formed.

5. The system of claim 4, wherein the at least one aperture is formed by etching a specific region on the other aperture.

6. The system of claim 1, wherein the at least one aperture and the other aperture are formed to have one of a circle, a triangle, a quadrangle, or a polygon.

7. The system of claim 1, wherein the at least one aperture introduces an optical signal of a different wavelength from a wavelength of an optical signal introduced by the other aperture.

8. The system of claim 1, wherein the auto focusing unit verifies the distance where the image sensor moves relative to the plurality of apertures, using a difference between blur levels in the plurality of images.

* * * * *